United States Patent [19]

Nelson et al.

[11] 3,902,575
[45] Sept. 2, 1975

[54] PROTECTIVE BRAKING MEANS FOR PRECISION MECHANISMS

[75] Inventors: Jerome William Nelson; James Bennett Randolph, both of Houston, Tex.; Robert Earl Pollock, deceased, late of Crown Point, Ind., by Peggy Pollock, executrix

[73] Assignee: CRC-Crose International, Inc., Houston, Tex.

[22] Filed: Apr. 1, 1974

[21] Appl. No.: 456,626

Related U.S. Application Data

[63] Continuation-in-part of Ser. No. 254,192, May 17, 1972, Pat. No. 3,806,694.

[52] U.S. Cl. .................. 188/67; 33/165; 74/531; 188/83; 403/138; 403/144
[51] Int. Cl.² ............................... F16D 63/00
[58] Field of Search .......... 188/83; 85/1 SS; 151/24; 33/165; 74/531; 242/84.51 R, 84.5 R, 156 R, 75.4; 403/137, 138, 144

[56] References Cited
UNITED STATES PATENTS

| | | | |
|---|---|---|---|
| 464,568 | 12/1891 | Johnson | 85/1 SS |
| 1,046,474 | 12/1912 | Marcuse | 242/55.2 |
| 1,499,298 | 6/1924 | Eller | 403/137 |
| 2,262,215 | 11/1941 | Ulm | 74/531 X |
| 2,729,126 | 1/1956 | Stenton, Jr. et al. | 85/1 SS X |
| 2,913,241 | 11/1959 | Miner | 85/1 SS X |
| 3,081,762 | 3/1963 | Smith | 151/24 |
| 3,416,746 | 12/1968 | Hull | 242/84.5 R |

FOREIGN PATENTS OR APPLICATIONS

| | | | |
|---|---|---|---|
| 1,029,621 | 5/1958 | Germany | 151/24 |
| 953,794 | 4/1964 | United Kingdom | 85/1 SS |
| 630,181 | 5/1936 | Germany | 403/137 |

*Primary Examiner*—George E. A. Halvosa
*Attorney, Agent, or Firm*—Edwin M. Thomas

[57] ABSTRACT

For retarding or locking precision adjusting screws or placing a braking torque or drag on other rotatable parts within a housing, a resilient tough resinous brake or drag element slidably located in a bore in the outer member is forced by an adjustable screw into radial contact with a relatively movable inner part. Thus, the retarding or holding means for a threaded micrometer screw is formed of tough plastic material with threads which match and engage the screw threads effectively to clean them while also protecting them against moisture, grit, etc. For non-threaded rotating parts, the retarding or brake shoe means conforms accurately to the surface and is held in broad area contact therewith by an adjustable screw plug in the bore which contains the brake element. A stiff coiled compression spring between a slidable brake shoe element and the screw plug which bears on it assures continued braking effect and compensates for wear. A precision screw for adjusting a part laterally includes a spherical end mounted in bearings and under resilient pressure for preventing backlash. Such micrometer type adjusting devices may be used for various purposes.

5 Claims, 8 Drawing Figures

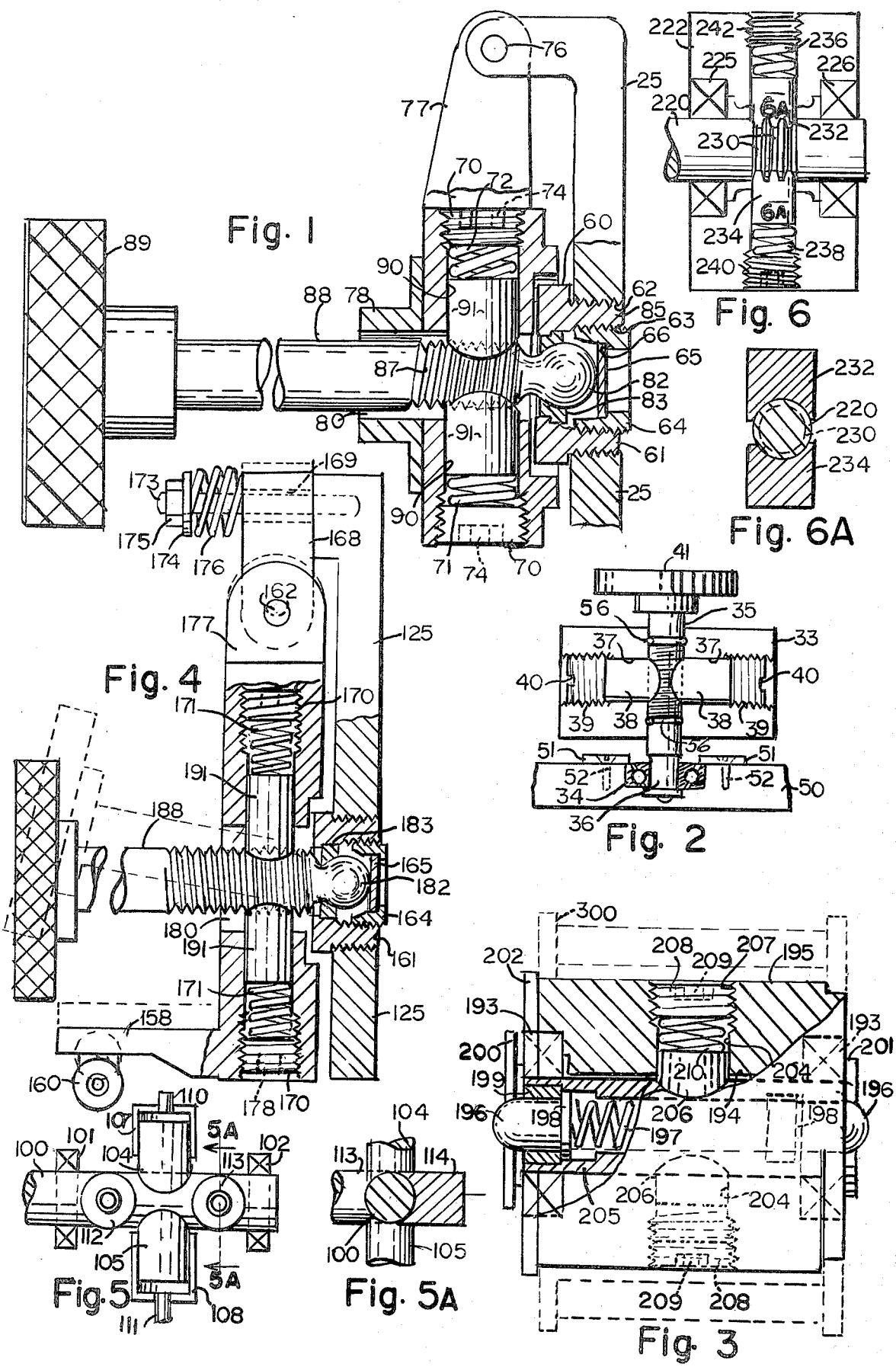

PROTECTIVE BRAKING MEANS FOR PRECISION MECHANISMS

This application is a continuation in part of Ser. No. 254,192, filed May 17, 1972, now U.S. Pat. No. 3,806,694.

BACKGROUND AND PRIOR ART

In the prior art, particularly in connection with precision equipment for welding pipe lines, difficulty has been encountered in maintaining high precision adjustments and/or control over relatively movable parts of the automatic welder equipment. Thus, micrometer adjusting screws, used for securing fine lateral or vertical alignment, spacing, etc., of parts, often are moved out of adjustment by vibrations, shocks, inadvertent contact by operators, etc. Also, under dusty, rainy, and other severe weather conditions, the precision parts are often jammed or clogged with foreign matter or damaged by corrosion as dirt and water gain access to threads and other vital parts which control the precision settings. Equipment, used for other purposes such as engineering and surveying instruments which includes micrometer adjustment parts may be similarly affected. In some respects, at least, the present invention is applicable to such instruments.

In welding pipe lines mechanically, where consumable steel electrode wire is fed to an electric welding arc from reels or spools holding a supply thereof, it is necessary also to maintain a precise and essentially constant control over reel mounting hubs and the like to prevent premature uncoiling, looping and resultant tangling and malfunction of the wire in the welding equipment. Here agin, retarding elements must not be subject to malfunctioning because of dirt, water, etc.

The present invention has the general object of solving problems of these types by providing effective and variably controllable retarding or braking torque means which hold rotatable parts in place or keep their rotary movement under constant control. When once properly set, they apply substantially constant braking torque to micrometer screws, hubs, axles, etc., over a wide range of conditions. The invention also includes aspects of cleaning and protecting fine machined or threaded parts in such mechanisms while also effectively holding them against inadvertent or accidental turning or maladjustment. Being well enclosed, the braking means not only are substantially protected against dirt and moisture but in their preferred forms they exert self-cleaning and dirt-sealing effects on the precision parts that are relatively movable. It is desirable also that the brake pads or friction elements be soft enough to imbed or absorb particles of grit and other abrasive materials, so as to minimize damage to the screw or other precision part which otherwise might be caused by such material.

Other objects will appear from the detailed description which follows.

BRIEF DESCRIPTION OF DRAWINGS

FIG. 1 is an enlarged view partly in section, of a movable precision adjustment screw device embodying one preferred form of the invention.

FIG. 2 is a sectional view, on smaller scale, of another modification using opposed brake elements on an adjusting screw.

FIG. 3 is a view of a different modification designed particularly for use in retarding premature unwinding of a wire reel supporting hub structure.

FIG. 4 is a view somewhat similar to FIG. 1 of a dual functioning micrometer adjustment mechanism.

FIGS. 5 and 5A are diagrammatic views showing a system which employs multiple retarding elements on a single rotatable element.

FIGS. 6 and 6A are side and sectional views, respectively, of another embodiment.

DESCRIPTION OF PREFERRED EMBODIMENT

Referring first to FIG. 1, there is shown a micrometer adjusting screw mechanism for relatively movable parts of an automatic pipe line welding machine of the type shown in the parent application, Ser. No. 254,192, mentioned above. This comprises a bracket member 77 which is to be adjustable laterally with respect to a relatively fixed frame member 25. The parts are pivoted together at 76. Bracket 77 carries a welding head, not shown, which requires a fine aligning adjustment with respect to a narrow welding gap to be filled with weld metal between pipe ends. The mechanism obviously can be used for many other purposes, wherever a floating or swinging member, analogous or functionally equivalent to bracket 77, is to be adjusted laterally with respect to a frame member such as 25. Thus, it is particularly but not solely designed for use in automatic precision welding devices.

The adjusting means comprises an adjusting screw 88 having a knurled head 89, a precision threaded portion 87 and a ball shaped outer or front end 82. The bore 80 which receives screw 88 through member 77 and also through a rear flanged collar 78 on member 77, is of somewhat larger diameter than the body of screw 88 to permit the screw to move up or down to accommodate various adjusted positions. The ball portion 82 is fitted into relatively adjustable parts so constructed and arranged as to protect the ball against wear while confining it snugly to prevent back-lash or play under any conditions of adjustment. The ball end 82 is engaged around its neck portion 80 by a split or multiple part bearing 83 of good wear resistant bearing material, such as bronze. The rear (left in FIG. 1) part of the ball 82 seats neatly in this bearing 83, which is mounted in a collar member 85. The latter comprises an enlarged flange 60 on its rear or left side, adapted to seat the bearing firmly. It is mounted in the left face of fixed member 25, comprising a hollow sleeve portion 61 extending to the right, and threaded externally so it can be screwed into and retained with a mating threaded opening 62 in frame member 25. The whole bearing mechanism and its mounting elements are enclosed to make them dust tight and moisture proof.

The sleeve 61 is also threaded internally at 63 to receive an externally threaded bushing or cup member 64 which bears a spring metal disc 65 or resilient diaphragm resting within a front flange element 66 of this cup. Cup member 64 thus is screwed into the hollow sleeve 61 to bring the diaphragm or spring disc 65 up against and in essentially point contact with the ball end 82 of screw 88. By adjusting the position of cup 65 in threads 63 of sleeve portion 61, the pressure of spring disc 65 on the ball 82 can be adjusted as desired to prevent any loose play or back lash.

Although tightening of diaphragm or disc 65 against ball 82 may provide a small degree of braking, since there is essentially point contact, it is desirable to augment this braking effect considerably, to make sure that vibration, jolting, or accidental contact with screw 88 or its head 89 will not disturb a pre-set adjustment. For this purpose, a braking or retarding mechanism, which also serves as a thread cleaning means is provided for the adjusting screw. This consists of a pair of nylon or other tough, firm, and wear-resistant resinous plastic resilient drag blocks or brake shoe elements 91. Each block 91 is a cylindrical plug or piston, neatly slidable in a side bore 90 formed in bracket 77. The blocks or shoes may, of course, be fitted in other parts attached to the movable bracket 77. The bores 90 are perpendicular to and radially intersect the shaft of adjusting screw 88. Each bore is threaded internally for part of its depth to receive an adjustable screw plug 70 which applies pressure to the resinous block or piston-like brake shoe element 91. Parts 91 should be closely fitted in bores 90. As shown in FIG. 1, pressure of each screw plug 70 preferably is applied to the brake element 91 through the medium of a coiled compression spring 71 or 72. A single wound spring 71 is shown below, where a double wound spring 72 is shown above. Either or both types may be used. In some cases they are not absolutely necessary. Where the block material is resilient, pressure may be applied directly to the brake element by the screw. Such an arrangement is shown in FIGS. 2 and 5, described hereinafter.

By applying considerable pressure to the plastic deformable brake element 91 it may "thread" itself or cut thread-conforming grooves on its inner end surface as it engages under pressure the metal threads of screw 88. Each element 91 thus becomes not only an effective friction brake, with an enlarged and effective braking surface to hold the screw in adjustment but also an effective dust and water seal and an effective close fitting cleaner for the screw threads. Its total area contact with the screw is increased and it makes an oblique angular contact with the sloping thread surfaces, enhancing the braking effect. By engaging threads or analogous grooves in the shaft, the braking action is very effective. An appropriate opening 74 in each plug 70 is formed to receive a suitable adjusting wrench, not shown. Although described in connection with a particular adjusting mechanism, the invention as described so far obviously is adaptable for many different parts and devices. In fact, a typical welding outfit for pipe lines may use a variety of automatic or semi-automatic welding devices and each device may include one, two, three, or more specific parts requiring adjusting means, of analogous if not identical types, e.g., to regulate electrode alignment, electrode wire feed and speed control means, spacing of a welding head from the work surface, etc. The device of FIG. 1 is adaptable to various of such needs.

FIG. 2 shows an alternative arrangement, including micrometer screw adjusting means, as used for precision spacing of a welding head from a work surface, the so-called "CTWD" (contact tube to work distance) in automatic welding of pipe lines, as described in the parent application. In this case, a welding head, not shown, is supported ultimately by a movable arm or bracket 50 which is to be adjusted up or down with respect to a main support arm or bar 33. These parts could also be components of any other precision adjustment means, e.g., as used in an instrument such as a civil engineer's transit, level, or the like. Bracket 50 is to be precisely adjusted in vertical position relative to arm 33.

A micrometer screw 35, having a knurled or milled head 41, is mounted in the arm 33 and has its lower end 36 of reduced diameter mounted in a play-free ball bearing 34 fastened to bracket 50. Of course, the end may be of other shapes. In FIG. 2 a holding plate 51 is secured to bracket 50 on either side of bearing 34 by a screw 52 which locks the bearing 34 in place. A pair of friction shoes or brake elements 38 are placed and closely fitted in lateral bores 37, formed in arm 33, to intersect radially and at right angles. They bear against the threaded part of screw 35. The outer part of each bore 37 is threaded to receive a pressure screw plug 39, bearing a screw driver slot 40, for adjustment to place desired pressure on the brake elements 38. This pressure forces them on to the screw with enough force to mold or cut thread counterparts in their resinous material. Obviously, the same arrangement may be applied to many types of screw adjusting devices. O-rings 56 above and below the threads protect the micrometer screw against dirt and corrosion.

In FIG. 3, a modification is shown for a somewhat different purpose. Instead of being carried in a bar or bracket and bearing directly on a threaded screw, as in FIGS. 1 and 2 the brake element is mounted in a rotatable hub 195 to apply a braking force between that hub and its supporting axle 205. Hub 195 and axle 205 are relatively rotatable, the axle here being normally non-rotatable. In automatic electric arc welding machines, such as described in the parent application, it is common to use a reel or spool of consumable electrode wire which is fed into and melted by the electric arc. This wire, usually slender and of steel, is resilient and tends to uncoil wildly and to tangle when the reel runs too freely. The structure shown in FIG. 3 constitutes the hub support for such a reel or spool, shown in dotted lines at 300. It comprises non-rotating hollow shaft 205 on which is mounted the rotatable hub shell 195, supported on sealed, dust-tight anti-friction bearings 193 of conventional type. Round ended pintles 196, slidably mounted in the hollow shaft 205, are urged apart by a coil compression spring 197 placed between them in this shaft. A flange 198 on each pintle normally engages the inner end of a sleeve 199 mounted in each end of hollow shaft 194, which prevents the pintles being ejected completely from the shaft by spring 197. The pintles themselves are adapted to engage openings in mounting brackets 200, 201, secured in the machine at either end of shaft 205, which thus removably hold the hub in place. These brackets form a part of the welding machine, which is no part of the present invention and is not shown. The wire reel or spool 300 is mounted by sliding it onto the outer hub shell 195 to abut a flange 202 formed around the left end of the shell, as seen in FIG. 3. Latching means of suitable type, not shown, secure the reel or spool 300 to the rotatable hub shell 195.

Hub 195 is provided with at least one, preferably two, radial bores 204 which intersect radially and at right angles with its central bore 194 which receives the hollow shaft 205. In each such bore is neatly fitted a brake shoe or friction pad 206 which slides smoothly, piston like, in the bore. Here again, these parts are closely fitted. The outer part of each bore is threaded at 207 to receive a screw plug 208; the latter has a wrench socket 209 by which it can be adjusted in the threaded bore.

A coil compression spring 210 between plug 208 and shoe 206 applies pressure to the brake element as the screw is adjusted to give the desired braking pressure against the spring. Each brake shoe may be molded to fit shaft 205 or may be worn into place to fit the contour of the non-rotatable hollow shaft 205 either by applying pressure to it through screw plug 208 or by wearing it under pressure while turning the outer hub shell 195 on the shaft. In either case the shaftcontacting inner ends of the shoes 206 preferably are formed to fit as neatly as practicable around the cylindrical surface of the hollow shaft. Fine fitting can be perfected by relative turning of the parts under pressure. An effective braking action, adjustably variable in its restraining torque over a wide range thus is applicable to control the rotation of the hub shell (and the spool of wire which it carries) on its mounting shaft. By this means the desired tension, which is quite constant, can be applied to the wire, preventing premature uncoiling and avoiding release of free-springing loops which otherwise can foul up the electrode material feeding operation.

Obviously, the hub brake and control mechanism just described can be used for many purposes other than control of wire feed to a welding machine. However, this is a critical operation in automatic welding which is considerably facilitated by use of the mechanism of FIG. 3. Since the hollow non-rotatable shaft 205 is of fairly large diameter, the effective braking torque applied to a reel of wire does not vary greatly from full reel to empty reel, since the effective pull radius on the wire, with a typical spool of wire 300 as used in welding operations, usually varies, as the reel is unwound, over a ratio of less than two to one.

As suggested above, the use of a coiled compression spring such as 71, FIG. 1 or 210, FIG. 3, is not always necessary. The resinous pads or brake shoe elements 91, 38 or 206, respectively, are somewhat resilient, per se; direct application of braking force to them without intervening springs, as by a screw, FIG. 2, may be satisfactory. However, where a high degree of constancy is desired in the braking torque, whether applied to a micrometer screw or to other rotating parts, the use of a spring is desirable and usually is preferable. It helps maintain substantially constant brake pressure despite small eccentricities in the parts. It should be noted that either the part to be engaged by or the part which supports the braking shoe may be truly rotatable. In the Claims below, the part to be retarded will be referred to as relatively rotatable with respect to its support.

The self-cleaning operation of the pads on screw threads is a good feature in the arrangements of FIGS. 1 and 2, as is also the protection given the threads against dirt, corrosion, etc. If desired, the brake shoe elements, such as 91 or 38, FIGS. 1 and 2, may be made as wide as the length of the threads normally used, so as to clean them quite completely and to seal them effectively against dirt, grit, water, etc. To some extent, at least, the friction elements can absorb or contain grit particles to minimize wear on the metal parts. In the past, expensive operations involving a whole pipe line spread have often been held up by a single failure of adjustment to hold and/or by premature uncoiling and tangling of electrode wire. The present invention has largely cured these problems.

FIG. 4 shows an arrangement somewhat like that of FIG. 1, wherein the parts are especially designed to permit relative vertical movement between the main frame and the movable unit or units. By moving the main screw about its anchored ball end as a pivot, the movable unit may be raised or lowered, whereas by turning the same screw, the lateral position of the movable member may be adjusted. A welding head, for example, may thus be raised or lowered with respect to a zone or surface to be welded, whereas its lateral alignment with respect to a weld line or plane may be adjusted also by the same mechanism.

A frame member 125, like or analogous to member 25 of FIG. 1, has at its upper end a sliding frictional mount for a movable member 168 which pivotally supports a bracket or sub-frame 177, analogous to or identical with the member 77 of FIG. 1. A coil spring 176, maintained under compression by a nut 175 and washer 174 on a screw 173 anchored in member 125, tends to hold these parts against relative movement, unless a deliberate adjustment up or down is to be made. Member 168 is slotted at 169 to permit such movement. The adjusting screw 188 mounted in member 177 has an inner or front ball end 182 engaged between a split or two-part bearing 183 and a spring plate 165 to prevent backlash or lost motion. Plate 165 is kept under resilient pressure against the ball by its mounting collar 164, which is threaded into an outer collar 161, the arrangement being much as in FIG. 1. Collar 161 is threadedly mounted in the frame member 125.

Slidable friction pads or brake elements 191, similar to parts 91 of FIG. 1, engage the threads on screw 188. They are closely fitted in their guide bores. Somewhat greater clearance for up and down movement is provided in member 177, at 180, than in the case of FIG. 1, to provide for deliberate raising or lowering of member 177 and the parts it supports, including a welding head 160. This is done by lifting or lowering the outer or head end of screw 188 manually, causing the frictionally held member 168 to slide up or down despite the friction by which it is held against unintentionable movement by spring 176. A raised position is shown in dotted lines, FIG. 4. Thus, the welding head 160, mounted in an arm 158 projecting from member 177, can be adjusted vertically. Rotation of screw 188 adjusts the welding head laterally, towards or away from member 125. The screw is held against misplacement in rotation by the pads 191, under pressure of springs 171, the tension of which is adjusted by turning screw plugs 170 by means of a tool which is received in wrench openings 178. As the adjusting screw 188 is moved to dotted line position, FIG. 4, member 168 slides up but the members 191 are sufficiently elastic or yielding to adjust to the shaft and threads of screw 188. If desired, the pads 191 may be arranged at the sides of screw 188, rather than above and below it. For minor up and down adjustments, this will better provide continuing and uniform braking action.

FIGS. 5 and 5A show an arrangement wherein several friction pads or sets thereof may be used to control a single rotatable shaft or like member 100. This shaft is mounted in anti-friction bearings, free of lost motion, as shown at 101 and 102. The shaft may be a smooth axle or analogous member or it may be a threaded screw as in FIGS. 1, 2 and 4. One pair of friction pads or brake elements 104, 105, is shown mounted in guides 107, 108 above and below the shaft 100. Retarding or braking pressure is applied to these pads by fluid means, such as by a hydraulic fluid supplied to the chambers behind the pads in guides 107 and 108 through fluid lines 110 and 11, respectively; the lines 110 and 111 are connected to suitable fluid pressure sources, not shown, as will be obvious. By these means, pressure on the pads may be adjusted or selected, as is desired, to give the needed braking action.

Other friction pads or brake elements may be similarly mounted and operated, as shown diagrammatically at 112, 113 and 114, being arranged at right angles about shaft 100 with respect to the pads 104 and 105. See FIG. 5A. All of these may be operated hydraulically, if desired. By these means, as much retarding force as may be desired can be placed on a single shaft 100, multiplying the brake elements as needed. Other means of operation or adjustment may be substituted for hydraulic means, if desired.

FIGS. 6 and 6A show still another arrangement wherein a rotatable shaft 220 is mounted on a frame 222 in anti-friction bearings 225 and 226. Machined into shaft 220 are a plurality of steep-sided annular grooves 230, separated by ribs to afford increased surface areas for brake engagement. Above and below the shaft 220 are mounted slidable friction pads or shoes 232 and 234, the ends of which are grooved and formed to snugly and neatly engage the grooves and ribs just described. Compression springs 236 and 238, under adjusted pressure of screw plugs 242 and 240, force the shoes against the steep oblique channel sides 230 with effective braking action; this is increased by the angles of contact involved. This may be considered a special case of enhancing the braking or retarding action by having the brake elements engage steep-sided or oblique surfaces of grooves formed in the relatively rotatable member. In this sense, the grooves 230 are analogous to threads on shafts such as 88, FIG. 1, or those in shaft 35 in FIG. 2. See also screw 188, FIG. 3. Preferably, the brake elements are formed to engage these grooved parts very intimately and in detail, to obtain optimum braking and cleaning effect.

It will be obvious that variations and modifications suggested or inherent in the above description and many others not mentioned, but which may occur to those skilled in the art, are within the spirit and proper scope of the invention. It is desired and intended that the Claims which follow shall be given their broadest proper scope, and interpretation, consistent with the limitations properly imposed by the prior art.

What is claimed is:

1. In a machine which comprises an adjusting screw mount, a machine part relatively movable with respect to said mount, a rotatable precision adjusting screw threaded through said mount and comprising an elongated shaft having a turning head on one end, a ball element on the other end, and multiple groove elements around said shaft intermediate its ends, said elements being disposed with said mount, and a play-free socket in the machine part snugly engaging said ball element, whereby turning of said screw about the shaft axis effects relative movement between said mount and the machine part, the combination which comprises a pair of opposed bores in said mount located to intersect the shaft at said grooved elements, a deformable plug freely slidable in each of said bores and formed of tough, resilient plastic material which will conform under pressure to intimately fit into said groove elements to effect cleaning of said groove elements when the shaft is turned and effectively brake the shaft against inadvertent turning after adjustment has been made, a compression spring behind each plug and a set screw threaded into the bore behind each spring to apply said groovecleaning and braking action to each of said plugs.

2. A combination according to claim 1 in which the grooved elements are part of the screw threads on said shaft.

3. A device according to claim 1 which comprises a threaded micrometer screw mounted in a shiftable member and bearing at its free end the ball element, and bearing means embracing said ball portion, and an elastic diaphragm member engaging said ball opposite said bearing means for eliminating play or backlash of said ball.

4. A device according to claim 1 in which the socket comprises a split bearing surrounding said ball portion, means for confining said split bearing around said ball portion, resilient diaphragm means engaging an opposite part of said ball portion for holding said ball portion firmly engaged in said split bearing, said screw being mounted for pivotal movement with respect to said ball portion to shift.

5. A device according to claim 1 in which the elastic brake element intimately engages said grooves in said shaft at oblique angles to enhance its braking action.

* * * * *